Aug. 28, 1923.

T. JAMES, JR., ET AL 1,466,589

AUTOMATIC PRESSURE RETAINING VALVE

Filed Jan. 24, 1922

Thomas James, Jr.
William I. Wolfson.
INVENTORS

BY Victor J. Evans
ATTORNEY

Patented Aug. 28, 1923.

1,466,589

UNITED STATES PATENT OFFICE.

THOMAS JAMES, JR., AND WILLIAM I. WOLFSON, OF PHILADELPHIA, PENNSYLVANIA.

AUTOMATIC PRESSURE-RETAINING VALVE.

Application filed January 24, 1922. Serial No. 531,485.

*To all whom it may concern:*

Be it known that we, THOMAS JAMES, Jr. and WILLIAM I. WOLFSON, citizens of the United States, residing at Philadelphia, in the county of Philadelphia and State of Pennsylvania, have invented new and useful Improvements in Automatic Pressure-Retaining Valves, of which the following is a specification.

This invention relates to pressure retaining valves and it has more particular reference to that class or type of such valves which are employed in connection with the air brakes on vehicles or trains adapted to travel on rails, the fundamental object being to provide an automatic pressure retaining valve that will ensure the retention of the requisite pressure in the brake cylinders during the recharging of the auxiliary reservoir or reservoirs.

Another object of this invention is to provide an automatic pressure retaining valve of the type above referred to which is simple in construction, effective in operation, not likely to get out of order, and furthermore is of a nature and type that can be readily and cheaply installed on existing rolling stock with but little expenditure of time and labor.

With the foregoing and other objects in view which will become more apparent as this description proceeds our invention consists essentially in the novel construction, combination and arrangement of parts constituting the automatic pressure retaining valve hereinafter fully described, and more specifically defined by the appended claims.

In the further disclosure of the invention reference is to be had to the accompanying sheet of drawings illustrative of one practical embodiment of our invention, and in which like characters of reference designate the same or corresponding parts in both the views.

Figure 1:
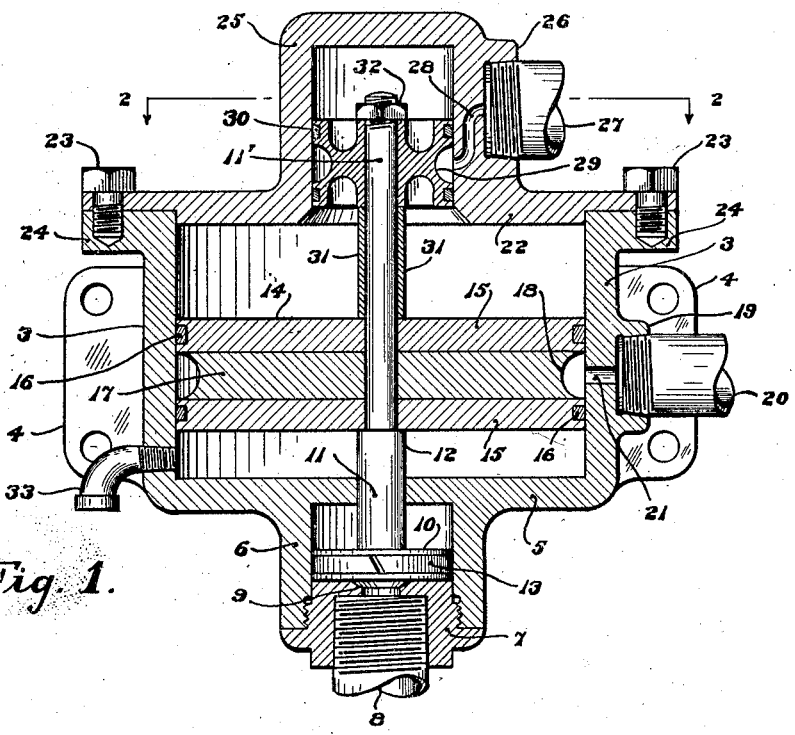
Figure 2:
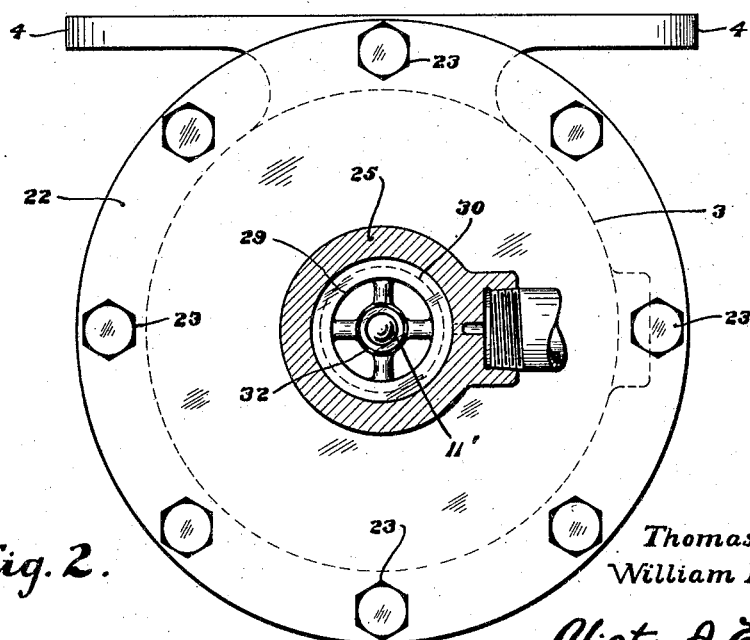

Figure 1 is a central vertical section through our automatic pressure retaining valve; and, Figure 2 is a plan view on the line 2—2 in the preceding figure, and looking in the direction of the arrows.

Referring more particularly to the views the main or cylindric body portion of our automatic pressure retaining valve is characterized by the numeral 3 and it will be seen that it is provided with integral flanges 4 by means of which said valve may be bolted or otherwise attached to the underframe of a railroad vehicle. This cylindric body portion 3 is formed with an integral bottom 5 and concentric therewith is a depending smaller cylinder 6 closed in by means of screw threaded coupling nut or sleeve 7 into which is securely screwed the end of a pipe 8 connecting with the auxiliary air reservoir—not shown—on a locomotive or other railroad vehicle. It is to be here noted that the inner end of the aforesaid coupling nut or sleeve 7 is provided with an inwardly directed flange 9 that constitutes an abutment for the inner end of the auxiliary air reservoir pipe 8.

Fitting within the depending smaller cylinder 6 is a piston 10 integral with a piston rod 11 which is shouldered and reduced at 12 for a purpose later on set forth, and said piston 10 is conveniently provided with a piston ring 13 of any approved pattern.

Located within the aforesaid main cylindric body 3 is a large piston 14 that is fitted on the piston rod 11 to abut the shouldered part 12, and it will be seen that this piston is made up of three concentric disks the upper and lower ones 15 whereof are fitted with appropriate rings 16, whereas the intermediate one 17 is peripherally grooved or concaved at 18 for a purpose hereafter set forth. Or said piston 14 may be made as a solid structure and fitted with rings and a circumferential groove as will be well understood by those acquainted with the art to which this invention appertains.

Connected into a ported boss 19 on the cylindric body 3 is a pipe 20 leading to the triple valve exhaust—not shown—whilst the port or orifice in said boss is designated by the numeral 21.

The upper open end of the aforesaid cylindric body 3 is closed in by a slightly inset head 22 conveniently secured by studs or bolts 23 to a flange 24 provided for the purpose on the body 3, and it will be seen that the aforesaid head 22 is formed with a central outstanding closed in cylinder 25. This outstanding cylinder 25 is formed with a boss or enlargement 26 at one side into which is screw-threaded the end of a pipe 27 connecting with the brake cylinder—not shown—communication between said pipe 27 and the interior of the cylinder 25 being established by an undulate port 28. Fitted on the upper end or reduced part 11′ of the aforesaid piston rod 11 and disposed within the outstanding cylinder 25 is what may be conveniently termed a grid piston 29 appropriately provided with suitable rings 30, a spacing sleeve 31 and lock-nut 32 threaded on the extreme upper end of the reduced part 11' serving to securely retain this grid piston 29 in proper spaced relation relative to the larger piston 14.

Having now described the structure of our automatic pressure retaining valve we will proceed to outline its use, it being first of all noted that in order to operate said valve it is first necessary to make a 15 to 20 lb. reducton in the brake pipe or train line, and after doing so the same pressure that was admitted to the pressure end of the brake cylinders passes through the brake cylinder pipe 27 and undulate port 28 to the upper side of the large piston 14. This pressure overcoming the remaining auxiliary reservoir pressure always acting through the pipe 8 on the underside of the smaller piston 10 that is normally forced upwardly by said auxiliary pressure—the same being necessary to keep the undulate port 28 and port 21 connecting with the triple valve exhaust open when our automatic valve is not in operation. After this operation the brake cylinder pressure on the top of the large piston 14 forces said piston down, and through the interconnection of said piston 14 with the piston 10 the latter will be correspondingly moved downwards, thereby manifestly closing the port 21. Consequent upon the downward movement of the pistons 14 and 10 it will be likewise seen that the grid piston 29 due to its interconnection therewith will close the undulate port 28. After the foregoing operation the pressure in the brake cylinder is unable to escape through the atmospheric exhaust designated 33 on Figure 1 thus being retained in the said brake cylinder until the auxiliary reservoir or reservoirs are recharged to a sufficient pressure to overcome the pressure that is maintained on the top of the larger piston 14 after the undulate port 28 became closed. As the piston 14 is raised the ports 21 and 28 are simultaneously opened and the pressure from the cylinder rushes through both so as to build up a pressure on each side of the piston 14. The pressure below the piston 14 will not be as great as that above owing to the gradual exhaust through 33. But the pressure on the under side of piston 10 will more than balance this inequality and will prevent the downward movement of the piston 14 by the pressure built up above it.

From the foregoing it will be clearly seen and readily understood by those conversant with the art that our automatic pressure retaining valve does not interfere in any way with the present method of working the air brakes with a brake pressure varying from zero to about 20 lbs. In other words, the brakes can be applied and released without causing our automatic pressure retaining valve to operate when the brake cylinder pressure does not exceed about 20 lbs. pressure.

Whilst there has been shown and described one practical embodiment of our invention, it is to be understood the same is susceptible of detail changes, and the right is hereby reserved to make such changes and other modifications thereof as fairly lie within the scope of the appended claims.

Having described our invention, what we claim as new and desire to secure by Letters Patent is:

1. An automatic pressure retaining valve for rolling stock including three axially aligning cylinders the intermediate one whereof is proportionately of considerably greater diameter than the outer ones, a piston in each cylinder securely mounted in definite spaced relation on a common piston rod, a connection from the brake cylinder into one of the outer smaller cylinders, a connection from the triple valve exhaust into the intermediate cylinder, an axial connection from the auxiliary reservoir into the other outer smaller cylinder, and an atmospheric bleed from the aforesaid intermediate cylinder.

2. The combination with the brake cylinder, triple valve exhaust and auxiliary air reservoir on a railroad vehicle of an automatic air pressure retaining valve comprising a main cylinder of relatively large diameter closed in at one end and having an axially concentric smaller cylinder integral therewith, a removable coupling closure for the open end of the main cylinder having an outstanding small cylinder integral therewith, and a piston in each cylinder mounted and operating simultaneously to close the inlet ports from the aforesaid brake cylinder triple valve exhaust and brake cylinder connection when the brake pressure is reduced to a predetermined degree.

3. The combination with the brake cylinder, triple valve exhaust and auxiliary air reservoir on a railroad vehicle of an automatic air pressure retaining valve comprising a main cylinder of relatively large diameter closed in at one end and having an axially depending concentric smaller cylinder integral therewith, means for supporting said main cylinder integral therewith, means for supporting said main cylinder on a railroad vehicle underframe, a removable coupling closure for the open end of the depending small cylinder, a removable head for the upper end of the main cylinder having an upstanding small cylinder integral therewith, and a connected piston in each cylinder mounted and operating simultaneously to close the inlet ports from the aforesaid brake cylinder triple valve exhaust and brake cylinder connection when the brake pressure is reduced to a predetermined degree.

4. The combination with the brake cylinder, triple valve exhaust and auxiliary air reservoir on a railroad vehicle of an automatic air pressure retaining valve comprising a main cylinder of relatively large diameter closed in at one end and having an axially depending concentric smaller cylinder concentric therewith, means for supporting said main cylinder on a railroad vehicle underframe, a removable coupling closure for the open end of the depending small cylinder, a removable head for the upper end of the main cylinder having an upstanding small cylinder integral therewith, a piston in the lowermost cylinder having an integral piston rod reduced and shouldered to receive the piston in the main cylinder, a grid piston in the uppermost cylinder spaced from the last mentioned piston by means of a tubular sleeve, and means for locking the three aforesaid pistons in spaced relation.

5. The combination with the brake cylinder, triple valve exhaust and auxiliary air reservoir on a railroad vehicle of an automatic air pressure retaining valve comprising a main cylinder of relatively large diameter closed in at one end and having an axially depending concentric smaller cylinder integral therewith, means for supporting said main cylinder on a railroad vehicle underframe, a removable coupling closure for the open end of the depending small cylinder, a removable head for the upper end of the main cylinder having an upstanding small cylinder integral therewith, a piston in the lowermost cylinder having an integral piston rod reduced and shouldered to receive the piston in the main cylinder, said piston in the main cylinder having a peripheral groove, a balance grid piston in the uppermost cylinder spaced from the last mentioned piston by means of a tubular sleeve, and means for locking the three aforesaid pistons in spaced relation.

In testimony whereof we affix our signatures.

THOMAS JAMES, Jr.
WILLIAM I. WOLFSON.